United States Patent [19]

Cope

[11] 3,891,277
[45] June 24, 1975

[54] HAND BRAKE AUTOMATIC RELEASE ASSEMBLY

[75] Inventor: Geoffrey Wilton Cope, Williamsville, N.Y.

[73] Assignee: Dresser Industries, Inc., Dallas, Tex.

[22] Filed: Sept. 26, 1974

[21] Appl. No.: 509,622

[52] U.S. Cl. .................... 303/2; 188/153 R; 303/18; 303/68
[51] Int. Cl.² ........................................... B60T 7/00
[58] Field of Search ............... 303/18, 2, 28, 35, 41, 303/43, 68, 71; 246/189, 184; 188/153 R, 197; 74/110

[56] References Cited
UNITED STATES PATENTS
2,166,001  7/1939  Farmer ..................... 188/153 R X
3,436,126  4/1969  Mousley ............................ 303/2

*Primary Examiner*—Trygve M. Blix
*Assistant Examiner*—Douglas C. Butler
*Attorney, Agent, or Firm*—Raymond T. Majesko

[57] ABSTRACT

A hand brake automatic release assembly for railway cars which utilizes the air flowing to the air brake cylinder, upon an air brake application, to automatically release the manually operated hand brake.

4 Claims, 4 Drawing Figures

HAND BRAKE AUTOMATIC RELEASE ASSEMBLY

One of the very troublesome problems with hand brakes, and one of the reasons for the introduction of the non-spin quick dump types currently used, it is an almost impossible job to release one of the older type hand brakes when it has been applied with a full air brake application. After a period of standing, the air brake would bleed off and leave the full pressure of the double brake application on the hand brake alone. Non-spin hand brakes have been developed and are now required because of the number of accidents caused by the difficulty in release and by spinning hand wheels when they have been released. An example of such a non-spin hand brake is illustrated on Page 703 of the Car Builders Cyclopedia.

Unreleased hand brakes on railway cars can, and do, cause severe problems, unnecessary expense, hazardous conditions, such as worn out brake shoes and brake heads, worn out wheel treads, broken wheels from overheating, derailments from broken wheels, worn rail heads, wasted power and poor truck action usually resulting in damage to the truck itself, the car and the loading.

A number of solutions to this problem have been suggested, but they fail to provide a release method compatible with the various methods of operation that are current or do not provide the fail-safe conditions so necessary with brake equipment.

Accordingly, it is an object of this invention to provide a hand brake release assembly that will function automatically, safely and reliably under all reasonable operating conditions without changes to current railway operating procedures.

Another object is to provide an automatic hand brake release assembly which utilizes brake cylinder air to actuate the hand brake release mechanism.

Another object of the invention is to provide an automatic hand brake release assembly which is unaffected by the status of the air brake system at the time of application of the hand brake.

A further object is to provide a hand brake release mechanism which will permit unlimited use of the hand brake regardless of the air brake system condition; and A still further object is to provide a hand brake release mechanism which will be actuated to release the hand brake on the first application of the air brakes which is usually the air brake test prior to in-train operation.

DESCRIPTION OF THE PREFERRED EMBODIMENT

Figure 1:
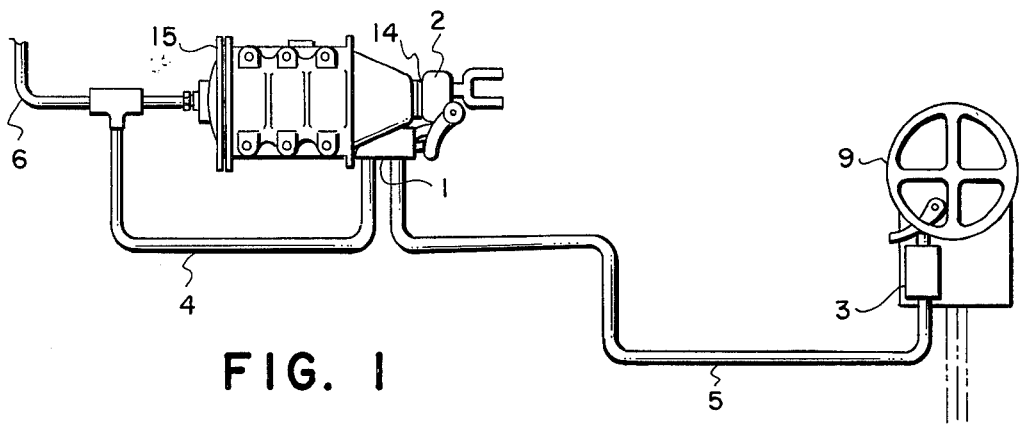
FIG. 1 is a schematic illustration of a portion of a conventional air brake system showing a teaching of the present invention.

In accordance with the present invention, there is provided a hand brake automatic release assembly for railway cars. It includes an air brake cylinder having a pipe means at one end connected thereto for receiving air and a reciprocable piston disposed at the other end. A normally closed actuating valve is disposed adjacent the air brake cylinder and may be attached thereto along with means for opening the valve. The valve contains an inlet and an outlet with inlet and outlet conduits connected thereto. The inlet conduit communicates with the brake cylinder pipe means. The outlet conduit communicates with a hand brake release cylinder which has a plunger extending therefrom for engagement with a hand brake release lever. Upon application of the air brakes, the normally closed actuating valve is opened by the opening means permitting air from the pipe means and inlet conduit to pass through the actuating valve and outlet conduit to the hand brake release cylinder. This extends the plunger in the cylinder to the hand brake release lever thereby freeing the hand brake.

Referring to the drawings, the assembly comprises an actuating valve 1, an opening means or valve actuator 2, a hand brake release cylinder 3 and connecting conduits 4 and 5. The actuating and operating air for the hand brake release mechanism is taken from the air brake cylinder pipe 6 by way of conduit 4 which connects with inlet port 7 of the actuating valve 1. The outlet port 8 of the actuating valve is connected by way of outlet conduit 5 to the brake release cylinder 3 which is attached to or built into the hand brake 9. The hand brake 9 must of necessity be the type known as the "quick release" or "dump" in which the brake can be released by the operation of a single lever.

The actuating valve 1 mounted on or near the air brake cylinder is normally closed to flow from conduit 4 and is biased toward the closed position by spring 10. Conduit 5 is normally open to the atmosphere through outlet port 8 and exhaust port 11.

Figure 2:
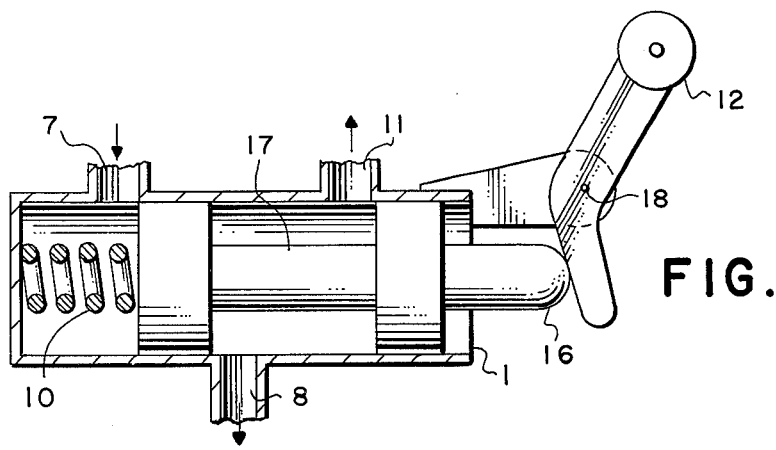
FIG. 2 is an elevation view partly in cross section of an actuating valve that may be used in the embodiment shown in FIG. 1.
Figure 3:
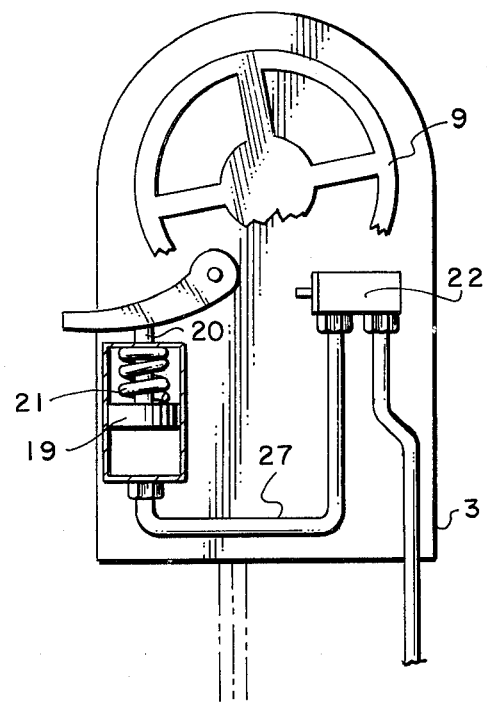
FIG. 3 is a schematic illustration of a manual hand brake for a railway car equipped with a brake release cylinder for automatically releasing the hand brake and which is in communication with air from the air brake cylinder air line.
Figure 4:
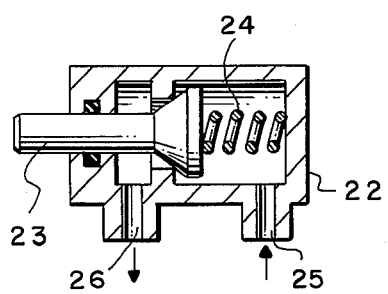
FIG. 4 is an elevation view in partial cross section showing a check valve which may be used in the embodiment shown in FIG. 3.

The valve 1 is actuated by an actuator arm 12, one end of which is arranged to be contacted by the valve actuation cam or collar 2 attached to the piston 14 of the brake cylinder 15 when the piston has traveled approximately two inches and up to about four inches of travel when contact will be lost. The other end is in contact with the extension 16 of the valve spool 17 and is pivoted at its approximate mid-point 18. Actuation of the arm 12 by the cam 2 rotates the arm clockwise about pivot 18 causing the valve spool 17 to be shifted toward the open position (left as viewed in FIG. 2). While the valve 1 is in the open position, the air from the brake cylinder pipe 6 and pipe 4 is permitted to flow through conduit 5 to the hand brake release cylinder 3.

In operation, when a freight car is left in a parked condition, the hand brake 9 is applied manually as required by railroad operating rules. The air brakes may or may not be set when the hand brake is applied. If it is not set, then no further activity will take place until the car is re-coupled into a train and the air brake is activated. If the air brake is set when the hand brake is manually applied, there is a good possibility that the air brake setting will eventually bleed off and the piston 14 will retract from its extended (applied) position under the influence of its return spring (not shown). In this case, the cam 2 will engage and actuate the hand brake release arm 12 and open valve 1 connecting the hand brake release cylinder 3 to brake cylinder pipe 6. However, the air pressure at this stage will be too low to actuate the release cylinder 3 against the hand brake application resistance. The release cylinder 3 contains a piston 19 and extending piston rod or plunger 20 which engages a release lever. A preloaded spring 21 which bears against the piston and top end of the cylinder assures that ample resistance is provided against premature release.

The automatic hand brake release mechanism takes advantage of the railroad operating rules which require that whenever a car is added to a train consist, an air brake test will be made before proceeding. Therefore, before any train can proceed, the air brakes are operated and checked for correct piston travel, etc., and in its procedure, as the air brake cylinder piston 14 is extended, the cam 2 will contact and actuate the actuator arm 12 causing it to shift the valve spools 17 to the left thus closing the exhaust port 11 and opening outlet port 8 to air pressure from pipe 6 and conduit 4 through inlet port 7 charging the conduit 5 and hand brake release cylinder 3 actuating the hand brake release mechanism in the so called quick release mode to release the brake.

The cam 2 will have contacted the actuator arm 12 at approximately 2 inches of travel and will remain in contact until about 4 or 5 inches of travel at which time contact will be lost and the spring 10 plus air pressure will return valve spool 17 to the right to the closed position and will open the exhaust port 11 to port 8 and conduit 5 exhausting the release cylinder 3 to atmosphere. The air brake cylinder piston will continue to extend to the required 7 to 9 inch travel called for by air brake regulations, but no further contact will be made with the actuating valve 1 until the air brake is released. During release, the cam 2 will contact the actuator arm 12 and valve 1 will open, but the air pressure under released conditions, as under bleed off conditions, will be only equivalent to the air brake cylinder spring force at that travel and too low to actuate the release cylinder 3 against the resisting force. Therefore, the hand brake will remain set.

Thus, on each air brake application, the hand brake release cylinder will be actuated momentarily and before the air brake is completely set, the air will be exhausted from the release cylinder to atmosphere, involving a loss of a small volume of air with each braking cycle. Thus, this small loss may be of no consequence in the air brake equalization pressure, but could readily be compensated for, if necessary, by an equivalent increase in reservoir capacity by the addition of an auxiliary volume in the air brake reservoir line.

To prevent operation of the brake release cylinder on every brake application, the system can be modified. A check valve 22 having a laterally extending poppet 23 maintains the valve in a normally closed position by a spring means 24. The valve can be mounted on the hand brake panel adjacent the release cylinder 3 or internally in the brake housing.

The inlet 25 of the valve 22 is connected to the actuating valve's outlet conduit 5 while the outlet 26 communicates with the release cylinder 3 by means of conduit 27. When the hand brake 9 is applied, a portion of the brake mechanism or a lug extending therefrom is arranged to engage the poppet 23 moving it laterally against the spring force opening the valve 22. Now when an air brake application is made, air passes through the valve to the release cylinder which frees the brake as previously described. However, where the hand brake is in a released condition, the poppet 23 is in the closed position and air is prevented from entering the release cylinder so that it will not operate on subsequent air brake applications.

Modifications and variations may be made herein without departing from the spirit and scope of the invention.

Having thus described the invention in detail and with particularity as to enable those skilled in the art to practice it, what is desired to have protected by Letters Patent is set forth in the following claims.

The embodiments of the invention in which an exclusive property or privilege is claimed are defined as follows:

1. A hand brake automatic release assembly for railway cars comprising an air brake cylinder having a pipe means at one end connected thereto for receiving air, and a reciprocable piston disposed at the other end, a normally closed actuating valve disposed adjacent the cylinder with means for opening the valve, said valve having an inlet and outlet with inlet and outlet conduits connected thereto, the inlet conduit communicating with the brake cylinder pipe means, the outlet conduit communicating with a hand brake release cylinder having a plunger extending therefrom for engagement with a hand brake release lever; upon application of air brakes, the normally closed actuating valve being opened by the opening means for only a finite portion of the piston travel permitting air from the pipe means and inlet conduit to pass through the actuating valve and outlet conduit to the hand brake release cylinder extending the plunger to operate the hand brake release lever thereby freeing the hand brake.

2. The assembly of claim 1 in which the actuating valve is a three-way valve in which the outlet is normally open to atmosphere and consists of a laterally movable spool contained within a cylindrical member, a portion of the spool extending externally of the cylinder.

3. The assembly of claim 2 in which the valve opening means is a cam means, attached to the brake cylinder piston, which in operation engages one end of a pivotally connected actuator arm causing the other end to depress the extending portion of the spool and shift it laterally which opens the actuating valve to the flow of air therethrough.

4. The assembly of claim 1 in which a check valve having an air inlet and outlet is connected at its inlet to the actuator valve outlet conduit, the check valve outlet communicating through a conduit with the hand brake release cylinder, said valve being opened for passage of air therethrough by the application of the hand brake and closed to the passage of air therethrough upon release of the hand brake.

* * * * *